United States Patent
Koberstaedt et al.

(10) Patent No.: US 8,843,278 B2
(45) Date of Patent: Sep. 23, 2014

(54) METHOD AND DEVICE FOR DETECTING THE ACTIVATION OF A COUPLING IN A DAMPER ACTUATOR

(75) Inventors: Markus Koberstaedt, Buehl (DE); Harrie Oirsouw, Blackburn South (AU); Murat Demir, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/388,989

(22) PCT Filed: Jul. 26, 2010

(86) PCT No.: PCT/EP2010/060767
§ 371 (c)(1), (2), (4) Date: Jun. 14, 2012

(87) PCT Pub. No.: WO2011/015477
PCT Pub. Date: Feb. 10, 2011

(65) Prior Publication Data
US 2012/0245800 A1    Sep. 27, 2012

(30) Foreign Application Priority Data

Aug. 5, 2009   (DE) .......................... 10 2009 028 249

(51) Int. Cl.
G06F 11/30 (2006.01)
E05F 15/00 (2006.01)
E05F 15/12 (2006.01)
B60J 5/10 (2006.01)

(52) U.S. Cl.
CPC .............. *B60J 5/101* (2013.01); *E05Y 2800/00* (2013.01); *E05Y 2201/216* (2013.01); *E05Y 2201/236* (2013.01); *E05Y 2800/748* (2013.01); *E05F 15/0017* (2013.01); *E05Y 2900/546* (2013.01); *E05Y 2600/56* (2013.01); *E05Y 2400/326* (2013.01); *E05F 15/124* (2013.01)
USPC ........................................ 701/49; 701/33.9

(58) Field of Classification Search
CPC ..................................... B60J 5/10; B60J 1/00
USPC ................................................... 701/49, 33.9
See application file for complete search history.

(56) References Cited

U.S. PATENT DOCUMENTS

2001/0035725 A1* 11/2001 Mintgen et al. ............... 318/445
2006/0006692 A1*  1/2006 Takahashi et al. ......... 296/146.4

FOREIGN PATENT DOCUMENTS

| CN | 1508523 A |   | 6/2004 |
|----|-----------|---|--------|
| CN | 1811117 A | * | 8/2006 |

(Continued)

OTHER PUBLICATIONS

English translation of CN 1811117 A.*

(Continued)

*Primary Examiner* — Fadey Jabr
*Assistant Examiner* — Yazan A Soofi
(74) *Attorney, Agent, or Firm* — Maginot, Moore & Beck

(57) ABSTRACT

A method is disclosed for detecting the activation of a coupling in a damper actuator, the coupling engaging a drive motor and an adjustable damper with each other, so that the damper can be adjusted by means of the drive motor, and the engagement between the drive motor and the damper being disengaged if a force or a momentum acting on the damper exceeds a maximum value. The method comprises the following steps: detecting the indication of an adjustment rate, in particular a rotary speed of the drive motor; determining a gradient of the adjustment rate, in particular a rotary speed gradient, by the indication of the adjustment rate; determining the activation of the coupling by determining whether the determined gradient exceeds or falls below a predetermined threshold value of the gradient.

10 Claims, 2 Drawing Sheets

(56) References Cited

FOREIGN PATENT DOCUMENTS

| | | |
|---|---|---|
| JP | 2004 027751 A | 1/2004 |
| JP | 2007 161175 A | 6/2007 |
| JP | 2007 177538 A | 7/2007 |
| WO | 2007/148181 A2 | 12/2007 |

OTHER PUBLICATIONS

International Search Report corresponding to PCT Application No. PCT/EP2010/060767, mailed Oct. 20, 2010 (German and English language document) (7 pages).

* cited by examiner

METHOD AND DEVICE FOR DETECTING THE ACTIVATION OF A COUPLING IN A DAMPER ACTUATOR

This application is a 35 U.S.C. §371 National Stage Application of PCT/EP2010/060767, filed on Jul. 26, 2010, which claims the benefit of priority to Serial No. DE 10 2009 028 249.1, filed on Aug. 5, 2009 in Germany, the disclosures of which are incorporated herein by reference in their entirety.

BACKGROUND

The disclosure relates to flap drives such as for example luggage compartment flaps and vehicle doors of a motor vehicle which can be operated electrically.

Flap systems for electric opening and closing are used in motor vehicles in luggage compartment systems or vehicle doors. Triggered by the actuation of an operating element, such as for example a switch, in the passenger compartment of the motor vehicle or by a remote control element, an electric motor is activated so as to open the flap. The electric motor is connected to the respective flap (vehicle door, luggage compartment flap and the like) via a spindle gearing or the like, so as to provide a corresponding speed and force for the opening process.

A closing process can likewise be triggered by means of a corresponding operating element or remote control element or else by pushing the flap in the closing direction. It may furthermore be provided that, in the case of the flap being pushed in the closing direction, the movement of the flap via the corresponding causes a rotation of the electric motor, which thereby produces a generator current. It may be provided that the generator current produced triggers the closing process, such that the electric motor is activated so as to close the flap, and the flap is correspondingly closed.

In general, the exertion of a force on the closing element causes a rotation of the electric motor. If, when a force is exerted on the closing element, a threshold value is exceeded, for example if a user imparts a large force for opening or closing the flap or the flap abuts against an obstruction during a movement driven by the electric motor, a clutch, in particular a slipping clutch, is provided between the electric motor and the gearing which is coupled to the flap, which clutch, when a force greater than a certain magnitude acts (above a disengagement threshold value), is disengaged. The disengagement of the clutch causes the movement of the flap to be decoupled from the movement of the electric motor. In other words, when the clutch in a flap drive is disengaged, the previously positively locking connection between the flap and the electric motor is eliminated.

In the case of electrically driven flap systems, a function is normally realized by means of which a maximum open position of the flap can be programmed by a user. To ensure that the position of the maximum open position is not exceeded, the position of the flap must be known at all times in the control unit which drives the flap system. This is generally possible by detecting the absolute rotor position of the electric motor and assigning this to a flap position. A disengagement of the clutch may however have the result that, in a flap system in which the position of the flap is determined not directly but rather only from the position of the rotor of the electric motor, the position information for the flap is lost. It is therefore necessary to detect the time of the disengagement of the clutch in order to identify when the position information can no longer be used for determining the flap position.

It is an object of the present disclosure to provide a method and a device for detecting a disengagement of a clutch in a flap system.

SUMMARY

Said object is achieved by means of the method as claimed in claim 1 and the device as claimed in the further independent claim.

The dependent claims relate to further advantageous refinements.

According to a first aspect, a method is provided for detecting a disengagement of a clutch in a flap drive. Here, the clutch couples a drive motor to an adjustable flap such that the flap can be adjusted by means of the drive motor, and wherein the coupling action between the drive motor and the flap is eliminated if a force or a torque acting on the flap exceeds a maximum value. The method comprises the following steps:

detecting data regarding an adjustment speed, in particular a rotational speed of the drive motor;

determining a gradient of the adjustment speed, in particular a rotational speed gradient, by means of the data regarding the adjustment speed;

detecting a disengagement of the clutch by determining whether the predetermined gradient exceeds or undershoots a predetermined gradient threshold value.

One concept of the disclosure consists in identifying when the clutch disengages, and the transmission of force to the flap thereby eliminated, by merely monitoring the adjustment speed of the drive motor, for example a rotational speed of an electric motor. If a force is exerted on the flap, for example as a result of manual actuation or as a result of the flap abutting against an obstruction, the clutch is disengaged after static friction has been overcome, and the transmission of force via the clutch is eliminated or considerably reduced. Upon the disengagement of the clutch, the adjustment speed of the drive motor, in particular the rotational speed of an electric motor, generally changes, because there is a resulting significant, fast change in the load moment. This is generally independent of whether or not the rotational speed of the electric motor is regulated. If a gradient of the adjustment speed is detected which lies above a gradient threshold value, this can be inferred as a disengagement of the clutch. In this case, it is for example possible for a function of the flap system for moving to a maximum, user-defined opening height to be deactivated.

It may furthermore be provided that, if a disengagement of the clutch is detected, an actuation of the drive motor is permitted only in the direction for closing the flap.

It may be provided that, if a disengagement of the clutch is not present, the position of the flap is detected from a position of a rotor of the drive motor.

According to one embodiment, during the movement of the flap, the position of the flap may be limited to a maximum open position.

It may be provided in particular that, if a disengagement of the clutch is detected, the flap is moved in the closing direction until an end position is reached, wherein when the flap has reached the end position, the position of the flap is assigned to a rotor position of the drive motor.

According to a further aspect, a device may be provided for detecting a disengagement of a clutch in a flap drive, in particular in a motor vehicle. The device comprises:

a drive motor;

a clutch which is designed to couple the drive motor to an adjustable flap such that the flap can be adjusted by means of the drive motor, and wherein the clutch is designed to eliminate the coupling action between the drive motor of the flap if a force or a torque acting on the flap exceeds a maximum value, having a control unit which is designed to detect data regarding an adjustment speed, in particular a rotational speed of the drive motor;

to determine a gradient of the adjustment speed, in particular a rotational speed gradient, by means of the data regarding the adjustment speed;

to detect a disengagement of the clutch by determining whether the determined gradient exceeds or undershoots a predetermined gradient threshold value.

According to a further aspect, a computer program product is provided which comprises program code which, when executed on a data processing unit, carries out the above method.

BRIEF DESCRIPTION OF THE DRAWINGS

Preferred embodiments of the disclosure will be explained in more detail below on the basis of the appended drawings, in which.

DETAILED DESCRIPTION

Figure 1:
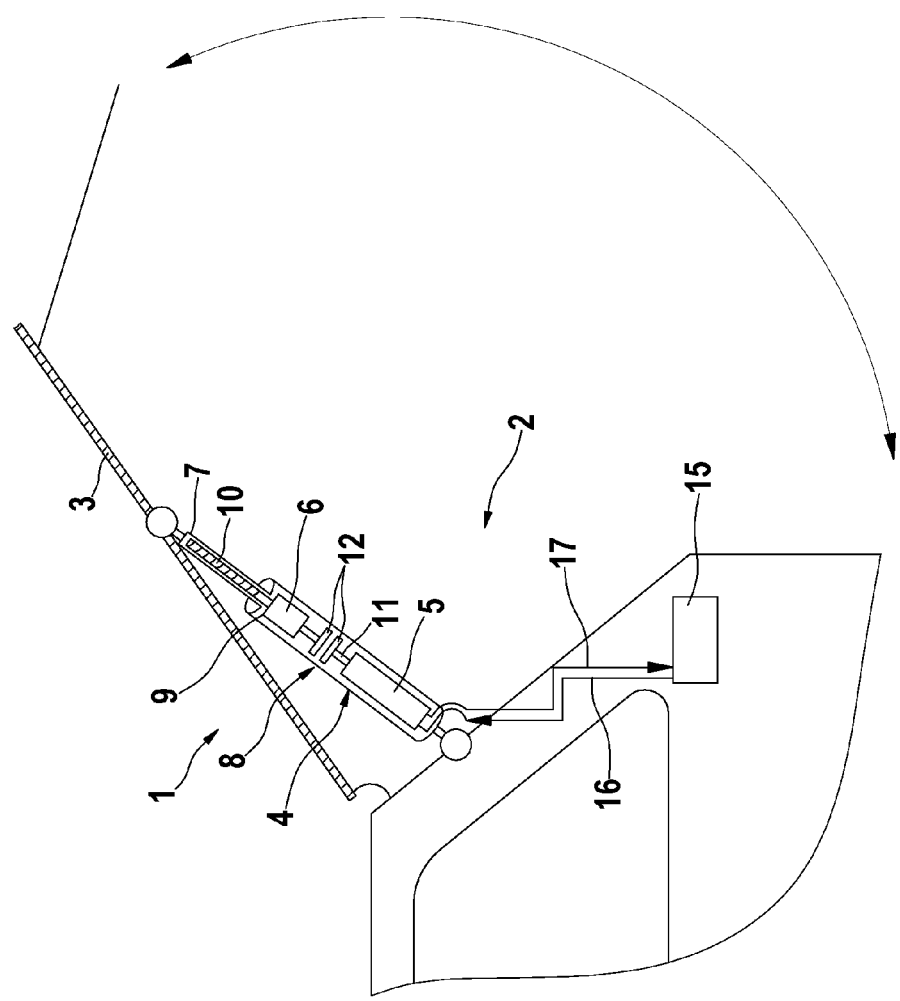
FIG. 1 is a schematic illustration of a flap system.

FIG. 1 shows a rear part of a motor vehicle 1 having a luggage compartment 2 which can be closed off by a luggage compartment flap 3. The luggage compartment flap 3 can be opened and closed by means of an electric drive system 4.

The drive system 4 comprises an electric motor 5 which is mechanically coupled to a gearing 6. In the present exemplary embodiment, a rotational movement of a drive output shaft 11 of the electric motor 5 is converted, in the gearing 6, into a translatory movement of a linkage 7 which engages on the luggage compartment flap 3. Here, a spindle 10 slides in a cylinder 9 of a gearing 6, such that the overall length of the linkage 7 changes. As a result of the translatory sliding of the linkage 7 or of the spindle 10, it is thereby possible for the luggage compartment flap 3, which is suspended in a pivotably movable manner, to be opened and closed.

Furthermore, there is arranged between the electric motor 5 and the gearing 6 a clutch 8, in particular a slipping clutch. The clutch 8 is designed in the form of a conventional clutch, for example with two clutch plates 12 which are pressed against one another with a force in order to attain a coupling action for the transmission of a torque by means of a static friction force. If the difference between the torques acting on the clutch plates via the drive input and drive output shafts is exceeded, the clutch disengages and the clutch plates slip relative to one another, such that the rotational speeds of the drive input and drive output shafts differ. The clutch 8 is dimensioned so as to disengage in the event of the action of an adequately high disengagement force in the movement direction of the linkage 7, that is to say a force acting on the linkage 7, or in the event of the action of an adequately high disengagement torque on clutch plates.

In alternative embodiments, the clutch may also be provided between the gearing 6 and the linkage 7. In this case, the clutch may be for example a plate clutch in which two plates are pressed against one another, such that if the static friction caused thereby is exceeded, the plates move relative to one another, and the length of the linkage 7 is thereby varied.

The drive system 4 is electrically actuated by a control unit 15 via corresponding supply lines 16. The control unit 15 is connected to operating elements (not shown) by means of which the user can indicate whether the luggage compartment flap 3 should be opened or closed. Furthermore, via a corresponding signal line from the electric motor 5, the control unit 15 detects a position signal PS which indicates the absolute position of a rotor of the electric motor 5. The position signal PS may be provided by a position sensor (not shown) arranged on the electric motor 5. The position signal PS serves for the detection of the present position of the luggage compartment flap 3. This is realized by means of a defined assignment of the present position of the rotor of the electric motor 5 to a position of the luggage compartment flap 3. To be able to carry this out, defined fixed coupling is required between the rotor of the electric motor 5 and the position of the luggage compartment flap 3.

In the control unit 15 there is often realized a function for ensuring that the luggage compartment flap 3, when it opens, moves only to a certain maximum position which is predefined by a user. In this way, it is possible to prevent situations in which the luggage compartment flap 3 abuts against an obstruction, for example the roof of a garage. In the case of an electrically driven opening process, the electric motor is correspondingly stopped at the maximum position.

However, if the clutch 8 disengages and said clutch is positioned between the rotor of the electric motor 5, the absolute position of which is detected, and the luggage compartment flap 3, the information regarding the position of the luggage compartment flap 3 is lost. As a result, the above function for limiting an opening process to a maximum position would no longer be implementable because, when it has been detected that the clutch 8 has disengaged, the position information PS can no longer be assigned to a position of the luggage compartment flap 3.

For the renewed calibration of the luggage compartment flap 3, the latter must be moved into a defined position, or fully closed. The defined position must be detectable, that is to say for example the fully closed state of the luggage compartment flap 3 must be detectable, for example from an increase in the current through the electric motor 5 when the luggage compartment flap 3 is blocked by an end stop. Furthermore, the end stop may also be signaled to the control unit 9 by a corresponding sensor.

For comfort reasons, the calibration process should not be carried out often. Provision is now made to detect when the clutch has disengaged, and to carry out a calibration preferably only when the clutch has disengaged. For this purpose, the rotational speed of the electric motor 5 is monitored for example by evaluating the position signal PS, and a disengagement of the clutch 8 is inferred for example on the basis of a change in the rotational speed signal. Data regarding the rotational speed may be derived for example from detected position information, by determining a change in position over a defined time period. By means of a derivation of the rotational speed data with respect to time, it is thereby possible to detect a change in rotational speed.

Owing to the inertia of the overall system, that is to say the mass of the luggage compartment flap 3 with the moment of inertia of the electric motor 5 and of the gearing 6 and also the inertia of the linkage 7, changes in rotational speed take place during the electromotive operation of the luggage compartment flap 3 which however do not exceed a certain rotational speed gradient value. In the event of an abutment of the luggage compartment flap 3 against an obstruction or as a result of a force being exerted on the luggage compartment flap which exceeds that during a manual actuation of the luggage compartment flap 3, generally as a result of the exertion of a large force, the clutch 8 can be disengaged if static friction is overcome. To permit manual adjustment of the luggage compartment flap 3, a disengagement limit value at which the clutch 8 disengages is selected to be so high that a manual actuation of the luggage compartment flap 3 does not automatically lead to a disengagement of the clutch 8. Only when an even higher force arises, such as for example in the event of the abutment of the luggage compartment flap 3 against an obstruction, does the clutch 8 disengage for safety reasons.

A disengagement results in a rapid change in the rotational speed of the electric motor 5. If the force acts on the luggage compartment flap 3 in the direction of an actuating movement of the electric motor 5, the electric motor 5 initially speeds up as a result of the action of the force on the luggage compartment flap 3; upon the disengagement of the clutch 8, the coupling action between the movement of the luggage compartment flap 3 and the rotational movement of the electric motor 5 is however significantly reduced, such that the torque exerted by the gearing falls and, as a result, the rotational speed suddenly decreases. The magnitude of the gradient of the rotational speed change then exceeds a certain rotational speed gradient threshold valve, and it can be inferred that the clutch 8 has disengaged.

If, in another situation, a force is exerted on the luggage compartment flap 3 which counteracts the drive movement of the electric motor 5, the electric motor 5 initially slows down until the clutch 8 disengages. After the disengagement of the clutch 8, the rotational speed suddenly increases, wherein the rotational speed gradient which is then present exceeds the rotational speed gradient threshold valve.

Figure 2:
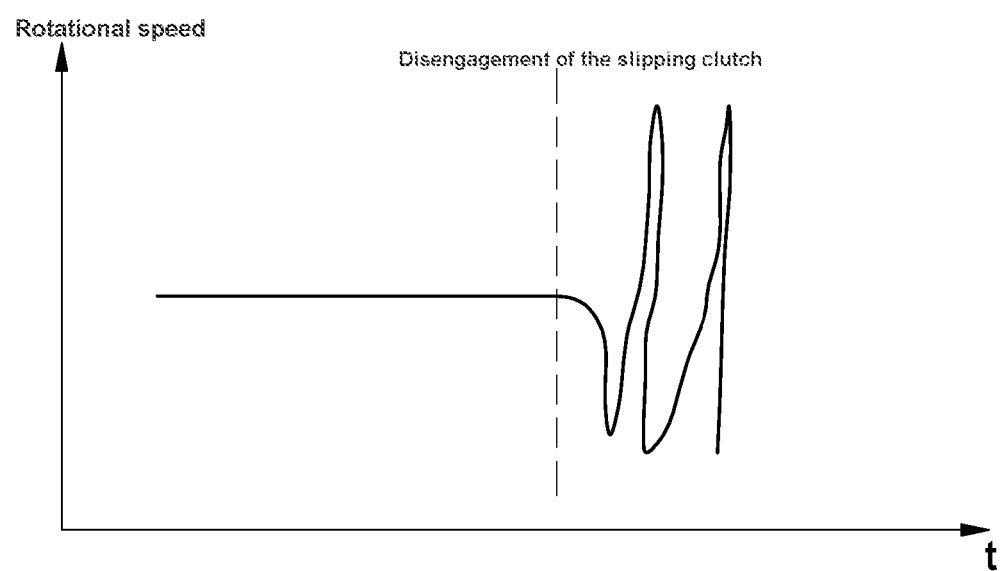
FIG. 2 is a schematic illustration of the rotational speed profile upon a disengagement of the clutch as a result of the action of an external force on the flap.

FIG. 2 shows the rotational speed profile before and after a disengagement of such a clutch 8, if the rotational speed of the electric motor 5 is regulated by means of a regulator. Owing to the high magnitude of the rotational speed gradient after the clutch 8 has disengaged, an intense intervention into the regulation takes place, which leads to an oscillation of the regulator. This can be clearly seen from FIG. 2.

It may furthermore be provided that, after the detection of a disengagement of the clutch 8, a movement of the luggage compartment flap 3 by means of the drive system 4 is permitted only in the direction of the closed position, in order to prevent a user-defined maximum position, that is to say open position of the luggage compartment flap 3, from being exceeded. Possible damage to the luggage compartment flap 3 can be prevented in this way.

The method described above may basically be applied to all electrically operable opening mechanisms in which a flap can be moved over an opening in order to open up or close off the opening.

The invention claimed is:

1. A method for detecting a disengagement of a clutch in a flap drive, wherein the clutch couples a drive motor to an adjustable flap such that the flap can be adjusted by the drive motor, and wherein the coupling action between the drive motor and the flap is eliminated if a force or a torque acting on the flap exceeds a maximum value, the method comprising:
   (a) detecting, by a control unit, data regarding an adjustment speed of the drive motor;
   (b) determining, by the control unit, a gradient of the adjustment speed based on the data regarding the adjustment speed; and
   (c) detecting, by the control unit, a disengagement of the clutch by determining whether the predetermined gradient exceeds or undershoots a predetermined gradient threshold value.

2. The method as claimed in claim 1, further comprising:
   if a disengagement of the clutch is detected in step (c), permitting, by the control unit–an activation of the drive motor only in the direction for closing the flap.

3. The method as claimed in claim 1, further comprising:
   if a disengagement of the clutch is not present in step (c), detecting, by the control unit, the position of the flap based on a position of a rotor of the drive motor.

4. The method as claimed in claim 3, further comprising limiting, by the control unit, the position of the flap to a maximum open position during the movement of the flap.

5. The method as claimed in claim 1, further comprising:
   if a disengagement of the clutch is detected in step (c), moving the flap in the closing direction until an end position is reached, wherein when the flap has reached the end position, the position of the flap is assigned to a rotor position of a rotor of the drive motor.

6. A device for detecting a disengagement of a clutch in a flap drive, comprising:
   a drive motor; a clutch configured to couple the drive motor to an adjustable flap such that the flap can be adjusted by the drive motor, and wherein the clutch is configured to eliminate the coupling action between the drive motor of the flap if a force or a torque acting on the flap exceeds a maximum value, and a control unit configured to:
   detect data regarding an adjustment speed of the drive motor;
   determine a gradient of the adjustment speed based on the data regarding the adjustment speed;
   detect a disengagement of the clutch by determining whether the determined gradient exceeds or undershoots a predetermined gradient threshold value.

7. A non-transitory computer readable medium comprises program code which, when executed on a data processing unit, carries out a method for detecting a disengagement of a clutch in a flap drive, wherein the clutch couples a drive motor to an adjustable flap such that the flap can be adjusted by the drive motor, and wherein the coupling action between the drive motor and the flap is eliminated if a force or a torque acting on the flap exceeds a maximum value, the method comprising:
   (a) detecting data regarding an adjustment speed of the drive motor;
   (b) determining a gradient of the adjustment speed based on the data regarding the adjustment speed; and
   (c) detecting a disengagement of the clutch by determining whether the predetermined gradient exceeds or undershoots a predetermined gradient threshold value.

8. The method of claim 1, wherein:
   step (a) includes detecting, by the control unit, data regarding a rotational speed of the drive motor, and step (b) includes determining, by the control unit, the gradient of the rotational speed based on the data regarding the rotational speed.

9. The device of claim 6, wherein the control unit is further configured to:
   detect data regarding a rotational speed of the drive motor, and
   determine a gradient of the rotational speed gradient based on the data regarding the rotational speed.

10. The computer program of claim 7, wherein:
    step (a) of the method includes detecting data regarding a rotational speed of the drive motor, and
    step (b) of the method includes determining the gradient of the rotational speed based on the data regarding the rotational speed.

* * * * *